Jan. 8, 1929.  H. H. BERRY  1,698,184

HEATING ELEMENT FOR ELECTRIC FIRES OR RADIATORS

Filed April 2, 1928

INVENTOR
H. H. BERRY
BY Jno Piviris ATTY.

Patented Jan. 8, 1929.

1,698,184

UNITED STATES PATENT OFFICE.

HERBERT HENRY BERRY, OF LONDON, ENGLAND.

HEATING ELEMENT FOR ELECTRIC FIRES OR RADIATORS.

Application filed April 2, 1928, Serial No. 266,786, and in Great Britain June 15, 1927.

This invention relates to heating elements for electric radiators and of the kind in which a support is externally grooved with one or more threads to receive one or more spirally wound or other resistance wires; it being usual to make the connections thereto at the ends of the supports and to retain the support in position by a rod passing through it.

According to my invention the support is made in three insulation units, a central unit carrying the single or multi-start thread and two end units adapted to fit into openings in the ends of the central unit and carrying the means for electrical connection. These three parts are mechanically connected together by a rod or equivalent, such as the bimetallic device hereinafter described. The central unit is preferably in one piece but may be in more than one and it and the end units engage in such a manner as to prevent relative turning movement after they are fitted together.

The resistance wire is arranged in the thread or threads of the central unit and is connected to one or both of the end units carrying means for making electrical connection to put the resistance in an electric circuit.

An advantage in making the central unit separately is that it can be pressed or moulded instead of being extruded and central parts of selectively different lengths can be used with the same ends thus making the fitting easily interchangable for fires of various widths. The bimetallic device can be made to exert, when heated, either a pulling or pushing effect on the two end units.

An example of my invention is shown in the accompanying drawings, in which:—

In these examples the central unit has hexagonal openings 3 adapted to receive the hexagonal parts 4 of the end units 2.

Figure 1:
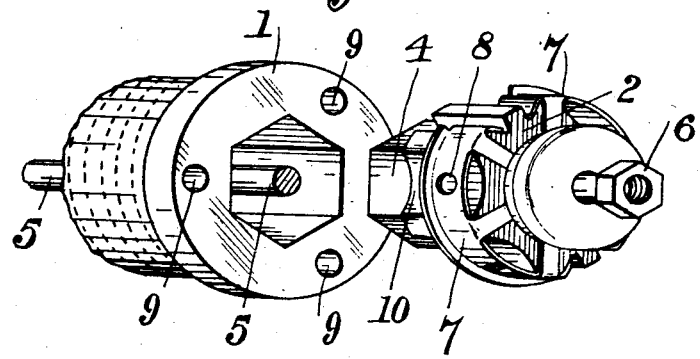
Fig. 1 shows the end of a central unit 1 and an end unit 2, these parts being shown separated.

In Fig. 1 part of a bolt 5 with nut 6 is shown as an appropriate means for holding the units together. The end units 2 have metal segments 7 adapted to receive by holes 8, the bolts and nuts, not shown, of the leads and connections for the resistance wires which pass through holes 9 in the end flanges of the unit 1 and along the grooves 10 in the unit 2. Any other suitable connecting means may be employed.

Figure 2:
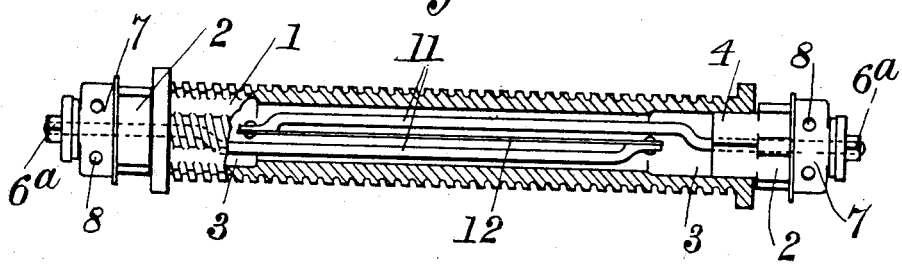
Fig. 2 shows, partly in section and on smaller scale, the whole support and the bimetallic connecting means.

In Fig. 2 instead of using a bolt such as 5 I use a connection comprising two bars 11, 11 of say iron, connected together by another bar 12 of metal having a greater coefficient of expansion. The ends of the bars 11 project through the end units and are there fitted with nuts 6ª, equivalent of that shown at 6 in Fig. 1.

The chief object in using a bimetallic device such as is shown is that if the central unit is in more than one part or if it is accidentally broken across it will be liable to sag and its appearance and efficiency will be impaired. This sagging is rectified by the bimetallic device, which shortens when heated and brings the parts into alignment.

Any other suitable device, such as a spring, may be employed to prevent or rectify disalignment of the central unit.

What I claim is:—

1. A heating element for an electric radiator consisting of a central insulation unit and two outer insulation units each adapted to fit into openings in the opposite ends of the central unit, means passing through the units which holds same together and prevents or rectifies disalignment of the units when the element is in use, and resistance wires arranged around the central unit and connected with means on an end unit for putting it into electrical circuit.

2. A heating element for an electric radiator consisting of a central insulation unit and two outer units each adapted to be partially received in openings in the opposite ends of the central unit, means on the outer units for preventing relative rotation between them and the central unit when received by same, means in the form of a bimetallic member which passes through the units and holds same together and prevents or rectifies disalignment of them when the element is in use, and a resistance wire arranged around the central unit and connected with means on the units for putting it into electrical circuit.

3. In a heating element for an electric radiator, a hollow central unit, resistance elements carried on the outside of the unit, end units fitting into the central member and a means carried internally of the central unit for drawing the two end units together when the resistance element is heated.

4. In a heating element for an electric radiator, a hollow central unit, a resistance element carried on the outside of the unit, metallic end segments non-rotatably fitting into the ends of the hollow central unit and connected to the resistance element to provide contact points for the said element and means for holding the metallic end in position.

In testimony whereof I affix my signature.

HERBERT HENRY BERRY.